United States Patent
Witheford

[15] 3,663,375
[45] May 16, 1972

[54] SEPARATION OF COMPONENTS FROM A REACTION PRODUCT MIXTURE OF WATER ISOBUTYRIC ACID AND METHACRYLIC ACID BY PHASE SEPARATION AND DISTILLATIONS

[72] Inventor: John Maurice Witheford, Wyckoff, N.J.

[73] Assignee: American Cyanamid Company, Stamford, Conn.

[22] Filed: Mar. 31, 1970

[21] Appl. No.: 24,362

[52] U.S. Cl. .................................203/15, 203/33, 203/35, 203/39, 203/53, 260/540, 260/526 N
[51] Int. Cl. ..................B01d 3/34, C07c 53/22, C07c 57/04
[58] Field of Search.....................203/14, 15, 35, 33, 34, 53, 203/39, 43; 260/526 N, 526 R, 540; 202/176

[56] References Cited

UNITED STATES PATENTS

| | | |
|---|---|---|
| 3,414,485 | 12/1968 | Speed.....................................203/15 |
| 2,266,004 | 12/1941 | Coes........................................203/15 |
| 2,111,510 | 3/1938 | Loder.....................................260/526 |
| 3,370,087 | 2/1968 | Hargis....................................260/526 |
| 3,337,740 | 8/1967 | Gray et al. ............................260/526 |
| 2,379,625 | 7/1945 | Coes......................................260/526 |
| 2,922,815 | 1/1960 | Faerber.................................260/526 |
| 2,551,625 | 5/1951 | Morrell et al..........................203/53 |

Primary Examiner—Wilbur A. Bascomb, Jr.
Attorney—Gordon L. Hart

[57] ABSTRACT

To separate aqueous and organic components of a mixture of isobutyric acid, water and methacrylic acid, the mixture is initially separated by salting out by means of a water soluble electrolyte e.g. sodium sulfate, which causes separation of aqueous and organic phases. Residuals in each phase are distilled off as a low-boiling mixed distillate resembling an azeotropic mixture which is returned for repeated separation by salting-out. Organics are further separated by fractional distillation.

6 Claims, 1 Drawing Figure

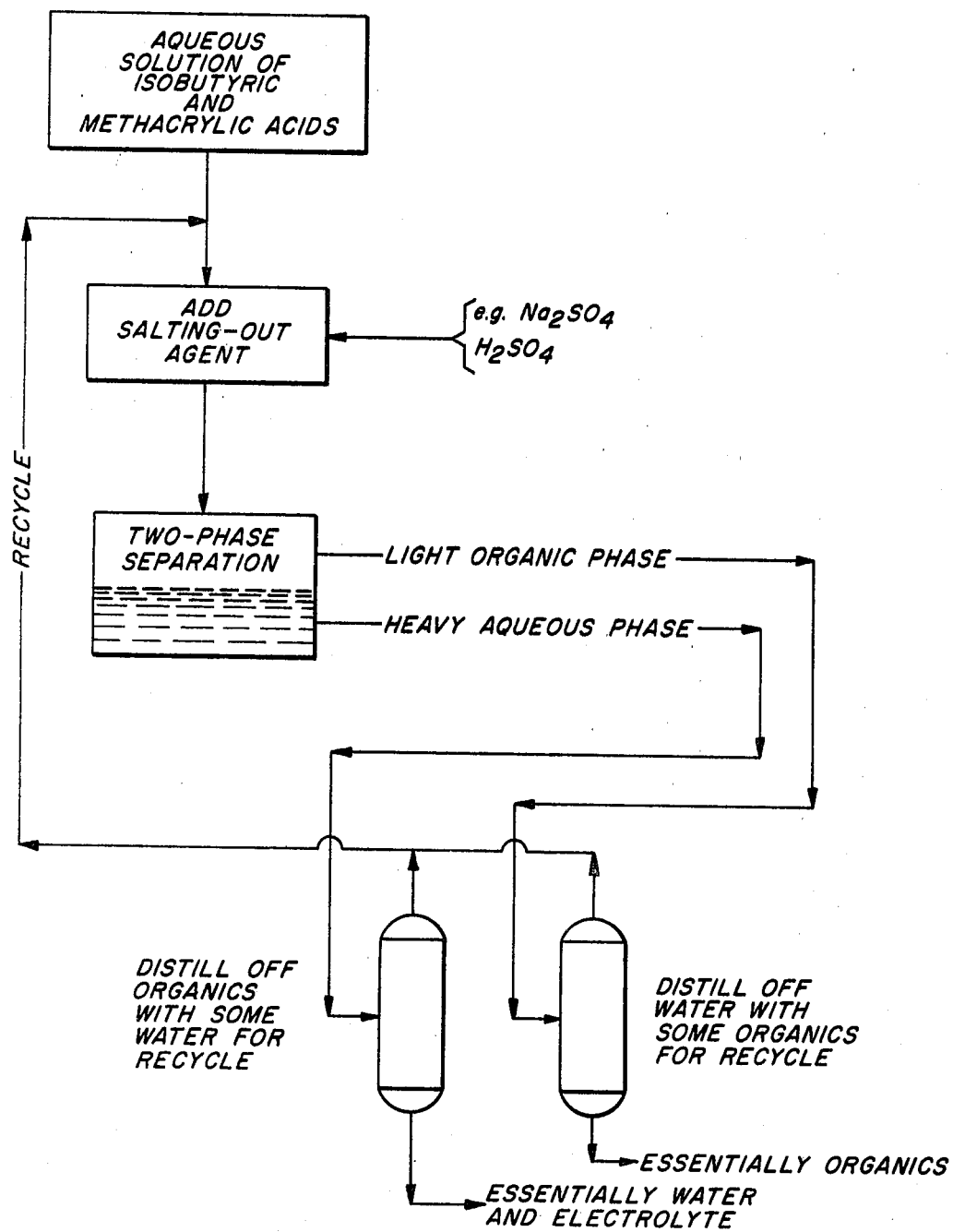

SEPARATION OF COMPONENTS FROM A REACTION PRODUCT MIXTURE OF WATER ISOBUTYRIC ACID AND METHACRYLIC ACID BY PHASE SEPARATION AND DISTILLATIONS

The invention relates to separation of aqueous and organic components from a mixture comprising isobutyric acid, methacrylic acid and water.

Copending U.S. Pat. application Ser. No. 818,818, filed Apr. 23, 1969 by Kin Hsueh-Yuan Tsu titled Catalytic Process for Manufacture of Unsaturated Acids and Esters describes a process comprising catalytic dehydrogenation of isobutyric acid (IBA) to make methacrylic acid (MAA). The product mixture obtained from the product condensation step in a preferred embodiment of that process comprises a mixture of isobutyric acid, methacrylic acid and water. Ordinarily these three components form a mutual solution from which water and the organic components cannot be completely separated by simple fractional distillation because of the presence of the two binary azeotropes of water with MAA (23 percent MAA, B. P. 99° C. at atm. press) and water with IBA (28 percent IBA, B. P. 98° C. at atm. press). Upon atmospheric distillation of the aqueous mixed acid composition the lowest boiling fraction is distilled over at about 99° C. In this first fraction the sum of the IBA and MAA concentrations is in the range of about 20–30 percent by wt. and a low-boiling distillate of about the same water to organics ratio continues to distill at the same temperature until either all of the water or all of the organic acids have been removed by distillation.

An object of the invention is to provide an efficient method for separation of the aqueous and organic components of a mixture comprising water, isobutyric acid and methacrylic acid.

According to the invention an electrolyte such as sodium sulfate or sulfuric acid is added to an aqueous solution of isobutyric acid and methacrylic acid in amount sufficient to cause salting-out, which is separation of the mixture into two immiscible phases; one phase is an aqueous sodium sulfate solution and other phase is an organic solution of the two acids. These two immiscible phases of the mixture are physically separated as by gravity in a decanter to obtain a principally aqueous solution of electrolyte with only very minor proportions of the organic components and a principally organic solution with only a very minor proportion of water. Each of these separated solutions is then distilled to remove only the low boiling distillate described above. From the organic phase, the small proportion of water is entirely removed in the low-boiling distillate and, similarly, from the aqueous sodium sulfate solution the residual organics are removed in the low-boiling distillate. The small proportion of low-boiling distillate from each phase is collected and separated by repeating the same steps just described.

After distillation of the low-boiling mixture from the organic solution, the anhydrous mixture of IBA and MAA may be further separated and purified by fractional distillation. Because of the very close boiling points of isobutyric acid and methacrylic acid, their separation by fractional distillation requires a fractionating column with about 40 to 50 plates or the equivalent, even with high reflux ratio in the range about 8–10. To prevent polymerization of methacrylic acid during distillation it is preferred to operate at low distillation temperatures and for this reason, vacuum distillation is preferred. When the invention is employed in connection with the dehydrogenation process as mentioned above, isobutyric acid recovered by the present process may be returned to the dehydrogenation process feed stream. The methacrylic acid residue of the vacuum distillation constitutes the purified product of the dehydrogenation process.

To achieve an efficient salting-out effect with sodium sulfate it is preferable to use enough sodium sulfate to provide, with the water of the mixture, at least 0.2 normal aqueous sodium sulfate solution and preferably 1 to 4 normal solution. Higher sodium sulfate concentrations may be used up to saturation. If another electrolyte is used, the concentration similarly should be high enough to salt out most of the organic components. Sodium sulfate may be present in the water that is used initially to make the mixture; for example, after the dehydrogenation process the water used for condensation may be previously prepared aqueous sodium sulfate solution. In such an embodiment, initial formation of the homogeneous ternary solution is inhibited and the aqueous and organic components of the mixture remain for the most part in separate phases. In other embodiments sodium sulfate may be added directly to an already solubilized mutual solution of the three components to cause the salting-out effect with separation of the components into aqueous and organic phases.

DESCRIPTION OF THE DRAWING

The accompanying schematic drawing illustrates diagrammatically for the sake of illustration the operation and the system for carrying out the process of this invention.

Following is an example setting forth in detail a most preferred mode of carrying out the invention as illustrated schematically in the drawing.

EXAMPLE 1

Vapors consisting essentially of water, isobutyric acid and methacrylic acid mixed with light gases from the catalytic dehydrogenation process described in U. S. Pat. application Ser. No. 818,818, mentioned above, are condensed in an aqueous spray chamber using about 2 normal sodium sulfate aqueous solution for the aqueous spray. Non-condensables, i.e. light gases pass upward through a scrubbing column counter-current to a stream of aqueous solution of sodium sulfate and are vented. Liquids from this column consist of aqueous sodium sulfate solution mixed with condensed methacrylic acid and isobutyric acid. The mixture is further cooled and led to a decanter. Proportions by weight of the components in the liquid mixture taken from the condenser are approximately 5–15 parts by wt. isobutyric acid, 10–20 parts by wt. methacrylic acid and 65–85 parts sodium sulfate aqueous solution. Neither isobutyric acid nor methacrylic acid is very soluble in the aqueous sodium sulfate solution and in the decanter the mixture separates into an aqueous layer and an organic layer. The aqueous layer contains 3–5 percent by wt. organics and the organic layer contains 5–10 percent by wt. water. The organic layer is drawn from the decanter and fed to a vacuum distillation column operated to distill over the lowest boiling distillate which is about 80 percent water and 20 percent mixed organic acids. Residue from the distillation consists essentially of an anhydrous solution of isobutyric and methacrylic acids. The distilled solution recovered overhead is returned to the decanter where sodium sulfate may be added. In a continuous process the returned solution picks up sodium sulfate in the decanter from the incoming condenser liquids and separates into immiscible phases as before. These phases are separated and distilled as before.

The anhydrous organic acid residue is led to a second vacuum distillation column having 50 plates, operated at a reflux ratio of 10 where isobutyric acid is distilled overhead and essentially pure methacrylic acid product is recovered as distillation bottoms.

The aqueous sodium sulfate solution from the decanter is led to another distillation column which is operated at atmospheric pressure. In this distillation the small proportions of isobutyric and methacrylic acid remaining in the aqueous solution are distilled overhead in the same 80 percent water, minimum boiling distillate described above, and this is condensed and returned to the decanter for further separation, the same as the distillate from the organic solution. Aqueous residue is essentially free of isobutyric and methacrylic acids and this sodium sulfate aqueous solution can be returned to the spray chamber for reuse in the dehydrogenation product condensation step. In some cases it may be preferred to concentrate the sodium sulfate solution in an evaporator before the solution is recycled.

The invention has been described with reference to specific embodiments, however, modifications and variations may be made within the scope of the invention. For example, another suitable electrolyte may be substituted for sodium sulfate. Any electrolyte that does not react with or dissolve in the organic phase may be used. Sulfuric acid, for example, is a suitable electrolyte for the purpose. Other mixtures comprising the same three components but varying in relative concentrations of any of the components of the mixture may be separated by a process comprising the invention. Separation of the ternary mixture as described may find other applications apart from the dehydrogenation process and its product condensation which are described in the specific example above.

I claim:

1. A method for separating the aqueous and organic components of a mixture of water, isobutyric acid and methacrylic acid comprising the steps of:
   a. dissolving in the water component of said mixture an electrolyte in amount sufficient to salt out the mixture to form immiscible organic and aqueous phases,
   b. separating the immiscible phases so formed as separate aqueous and organic solutions and distilling from each of the separated organic and aqueous solutions a low-boiling distillate which consists essentially of water, isobutyric acid and methacrylic acid leaving separate organic and aqueous residues respectively consisting essentially of a mixture of isobutyric acid and methacrylic acid and an aqueous solution of said electrolyte.

2. A method defined by claim 1 wherein said electrolyte is sodium sulfate.

3. A method defined by claim 1 further comprising the steps of repeating the defined steps (a) and (b) on the distillate mixtures obtained from the first defined step (b).

4. A method comprising the steps of:
   a. mixing condensate comprising isobutyric acid and methacrylic acid with water which contains dissolved electrolyte in quantity sufficient to salt out the mixture thereby forming immiscible organic and aqueous phases,
   b. separating the immiscible phases so formed as separate aqueous and organic solutions and distilling from each of the separated organic and aqueous solutions a low-boiling distillate which consists essentially of water, isobutyric acid and methacrylic acid leaving separate organic and aqueous residues respectively consisting essentially of a mixture of isobutyric acid and methacrylic acid and an aqueous solution of said electrolyte.

5. A method defined by claim 4 wherein said electrolyte is sodium sulfate.

6. A method defined by claim 4 further comprising the steps of repeating the defined steps (a) and (b) on the distillate mixtures obtained from the first defined step (b).

* * * * *